(12) United States Patent
Keate (10) Patent No.: US 7,676,897 B2
(45) Date of Patent: Mar. 16, 2010

(54) PROCESS OF REFURBISHING BRAKE COMPONENTS

(76) Inventor: Robert A. Keate, 816 E. 2200 North, Lehi, UT (US) 84043

( * ) Notice: Subject to any disclaimer, the term of this patent is extended or adjusted under 35 U.S.C. 154(b) by 0 days.

(21) Appl. No.: 11/083,588

(22) Filed: Mar. 17, 2005

(65) Prior Publication Data

US 2006/0207080 A1   Sep. 21, 2006

(51) Int. Cl.
  *B23P 6/00*   (2006.01)
  *B23P 19/04*   (2006.01)
(52) U.S. Cl. ............... 29/402.07; 29/402.13; 29/402.16
(58) Field of Classification Search . 29/402.03–402.11, 29/402.13, 402.16, 403.1–403.4
  See application file for complete search history.

(56) References Cited

U.S. PATENT DOCUMENTS

| | | | |
|---|---|---|---|
| 2,747,264 A * | 5/1956 | Buvelot | .................... 29/402.13 |
| 3,606,665 A * | 9/1971 | Glucoft | .................... 29/402.18 |
| 3,610,377 A | 10/1971 | Leffert | |
| 4,059,884 A * | 11/1977 | Weill | ........................ 29/402.13 |
| 4,269,002 A | 5/1981 | Venere et al. | |
| 4,336,730 A | 6/1982 | Kopecko et al. | |
| 4,766,702 A | 8/1988 | Kinner | |
| 4,822,248 A * | 4/1989 | Wertz et al. | .................. 416/192 |
| 4,859,491 A | 8/1989 | Yan | |
| 5,040,338 A | 8/1991 | Schwär | |
| 5,056,266 A | 10/1991 | Norris | |
| 5,181,588 A | 1/1993 | Emmons | |
| 5,249,649 A | 10/1993 | Emmons | |
| 5,447,035 A | 9/1995 | Workman et al. | |
| 5,547,717 A | 8/1996 | Scaringella et al. | |
| 5,607,348 A | 3/1997 | Lopez | |
| 5,643,057 A | 7/1997 | Isaacson | |
| 5,775,603 A | 7/1998 | Kohler et al. | |
| 5,816,901 A | 10/1998 | Sirany | |
| 5,865,913 A | 2/1999 | Paulin et al. | |
| 5,884,388 A | 3/1999 | Patrick et al. | |
| 6,213,260 B1 | 4/2001 | Sirany et al. | |
| 6,477,928 B2 | 11/2002 | Newell et al. | |
| 6,537,396 B1 | 3/2003 | Ijames | |
| 6,726,962 B1 | 4/2004 | Loszewski | |
| 7,047,612 B2 * | 5/2006 | Bridges et al. | ........... 29/402.07 |

(Continued)

FOREIGN PATENT DOCUMENTS

WO   WO-98/00575   1/1998

OTHER PUBLICATIONS

STIC-search results.*

*Primary Examiner*—David P Bryant
*Assistant Examiner*—Christopher M Koehler
(74) *Attorney, Agent, or Firm*—Clayton, Howarth & Cannon (57) ABSTRACT

A method of refurbishing components such as brake rotors and drums is disclosed. The method may involve identifying, sorting and cleaning used or worn components. The components may then be blasted with an abrasive material to prepare them for a metal deposition process. Metal may then be added to the components using an arc spray gun, for example. The component may then be cryogenically treated to improve the wear characteristics of the component. The component may then be machined to place the component within a specified configuration. Components may be refurbished repeatedly in this manner so as to utilize resources more efficiently and reduce waste. Moreover, the components may exhibit improved wear characteristics over components manufactured by other methods.

53 Claims, 3 Drawing Sheets

U.S. PATENT DOCUMENTS

2002/0168466 A1 11/2002 Tapphorn et al.
2002/0179204 A1* 12/2002 Brunson .................... 148/578
2003/0145694 A1 8/2003 Zurecki et al.
2007/0023112 A1* 2/2007 Campbell et al. ........... 148/577

* cited by examiner

PROCESS OF REFURBISHING BRAKE COMPONENTS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

1. The Field of the Invention

The present disclosure relates generally to processes for refurbishing components, and more particularly, but not necessarily entirely, to methods for refurbishing brake rotors and drums using a cryogenic treatment process.

2. Description of Related Art

Mechanical components are commonly subject to wear after repeated use. For example, automobile parts, including brake rotors and drums, commonly require repair or replacement after a specified amount of wear. A brake rotor is a round metal disc which rotates with an automobile's wheel. In order to generate a braking force, the brake rotor is clamped by a caliper holding two friction linings or pads. Similarly, a brake drum is a cylindrical metal component that rotates with the automobile's wheel. A set of brake shoes may be provided to act on the drum by expanding to provide a braking force.

Wear of brake rotors and drums caused by use of the vehicle, whether excessive or routine wear or other wear, may cause the braking surface of the rotors and drums to wear unevenly due to heat generated during routine braking. This may also possibly cause warping of the braking surface. In such cases, the braking surface must be resurfaced or replaced, if the wear is beyond specified tolerances. Current art dictates that such parts be scrapped. This invention provides for the reclaiming of these parts.

Resurfacing components such as brake rotors and drums has previously been difficult to accomplish mainly due to expense. Similarly, replacing components such as brake rotors or drums has various drawbacks. For example, the worn brake rotors or drums are commonly wasted, thereby incurring disposal costs and adding to waste accumulation at storage and disposal sites. Also, the accumulation of wasted components may add to environmental pollution. Moreover, additional material usage may be required to manufacture replacement rotors or drums. This may add to environmental problems by increasing the required amount of mining of raw materials, for example, and by increasing the pollution generated by converting the raw materials to the finished components through the manufacturing process.

The prior art is thus characterized by several disadvantages that are addressed by the present disclosure. In addition to providing the capability to reclaim worn out components, the present disclosure minimizes, and in some aspects eliminates, the above-mentioned failures, and other problems, by utilizing the methods and structural features described herein.

The features and advantages of the disclosure will be set forth in the description which follows, and in part will be apparent from the description, or may be learned by the practice of the disclosure without undue experimentation. The features and advantages of the disclosure may be realized and obtained by means of the instruments and combinations particularly pointed out in the appended claims.

BRIEF DESCRIPTION OF THE DRAWINGS

The features and advantages of the disclosure will become apparent from a consideration of the subsequent detailed description presented in connection with the accompanying drawings in which.

DETAILED DESCRIPTION

For the purposes of promoting an understanding of the principles in accordance with the disclosure, reference will now be made to the embodiments illustrated in the drawings and specific language will be used to describe the same. It will nevertheless be understood that no limitation of the scope of the disclosure is thereby intended. Any alterations and further modifications of the inventive features illustrated herein, and any additional applications of the principles of the disclosure as illustrated herein, which would normally occur to one skilled in the relevant art and having possession of this disclosure, are to be considered within the scope of the disclosure claimed.

The publications and other reference materials referred to herein to describe the background of the disclosure, and to provide additional detail regarding its practice, are hereby incorporated by reference herein in their entireties, with the following exception: In the event that any portion of said reference materials is inconsistent with this application, this application supercedes said reference materials. The reference materials discussed herein are provided solely for their disclosure prior to the filing date of the present application. Nothing herein is to be construed as a suggestion or admission that the inventors are not entitled to antedate such disclosure by virtue of prior disclosure, or to distinguish the present disclosure from the subject matter disclosed in the reference materials.

It must be noted that, as used in this specification and the appended claims, the singular forms "a," "an," and "the" include plural referents unless the context clearly dictates otherwise. Moreover, in describing and claiming the present disclosure, the following terminology will be used in accordance with the definitions set out below.

As used herein, the terms "comprising," "including," "containing," "characterized by," and grammatical equivalents thereof are inclusive or open-ended terms that do not exclude additional, unrecited elements or method steps.

As used herein, the term "cryogenic" shall be construed to refer to the treatment of any material at very low temperatures. The corresponding temperatures may be low enough to metallurgically transform components such that the components exhibit improved characteristics after treatment.

As referred to herein, the term "refurbish" shall be construed broadly to include situations in which a component is renovated, restored, revised, modified or treated from a worn, damaged, diminished or otherwise deficient or inferior condition to an improved condition.

As referred to herein, the phrase "wear characteristics" shall refer to features of a component, such as strength, hardness, or durability, for example, that enable a component to remain in a specified configuration through use, attrition or exposure, for example.

As referred to herein, the term "substrate" shall be construed broadly to include a body or base onto which a material may be deposited, including a component such as a brake rotor or brake drum onto which a material may be added to replace a portion of the component that has been diminished.

As used herein, a component that has been "machined," shall be construed broadly to refer to components made, prepared, finished, revised, renovated, restored, modified or treated with a machine, including power operated machines and non-power operated machines and manually operated machines, or with tools including hand tools or tools not considered hand tools.

The principles of the present disclosure may be used for refurbishing various kinds of components that may be worn or otherwise in need of improvement. For example, referring to FIG. 1, a perspective view is shown of a component, in the form of a brake rotor 12, for use in accordance with the principles of the present disclosure. The brake rotor 12 may be formed in various different configurations for rotating with a vehicle's wheel and generating a braking force. The brake rotor 12 may include a braking surface 14 that may be clamped by a caliper holding friction linings or pads (not shown) to generate the braking force. After repeated use, the braking surface 14 and/or the brake pads may wear or fatigue causing a diminished surface, surface irregularities or internal discontinuities. If the brake rotor 12 becomes worn to a point beyond acceptable tolerances, it may need to be repaired or replaced.

Figure 2:
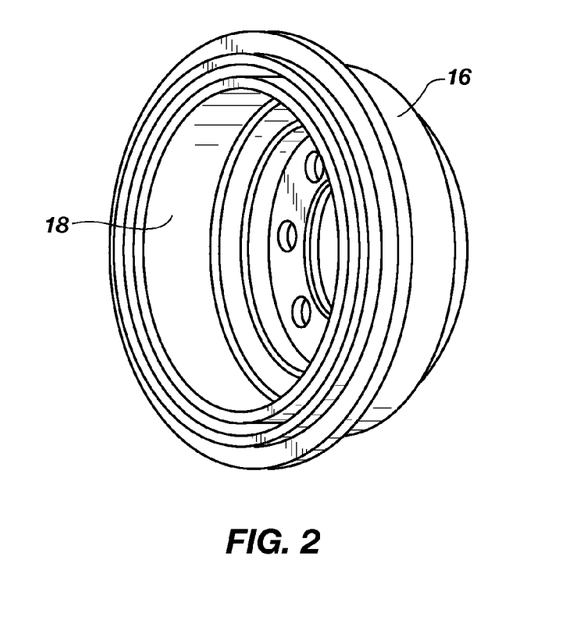
FIG. 2 is a perspective view of a component in the form of a brake drum for use with the principles of the present disclosure.

Similarly, as depicted in FIG. 2, a perspective view of another component in the form of a brake drum 16 is shown. The brake drum 16 may also have a braking surface 18. A set of brake shoes (not shown) may be provided to act on the braking surface 18 of the brake drum 16 by expanding to provide a braking force. Similar to the brake rotor 12, the brake drum 16 may also be worn or damaged such that repair or replacement may be required. It is to be understood that other types of components, including other items, vehicle parts or non-vehicular parts may also require refurbishing to place the components in an improved condition within the scope of the present disclosure. Accordingly, the present disclosure is not to be limited for use with brake rotors 12 and brake drums 16.

Figure 3:
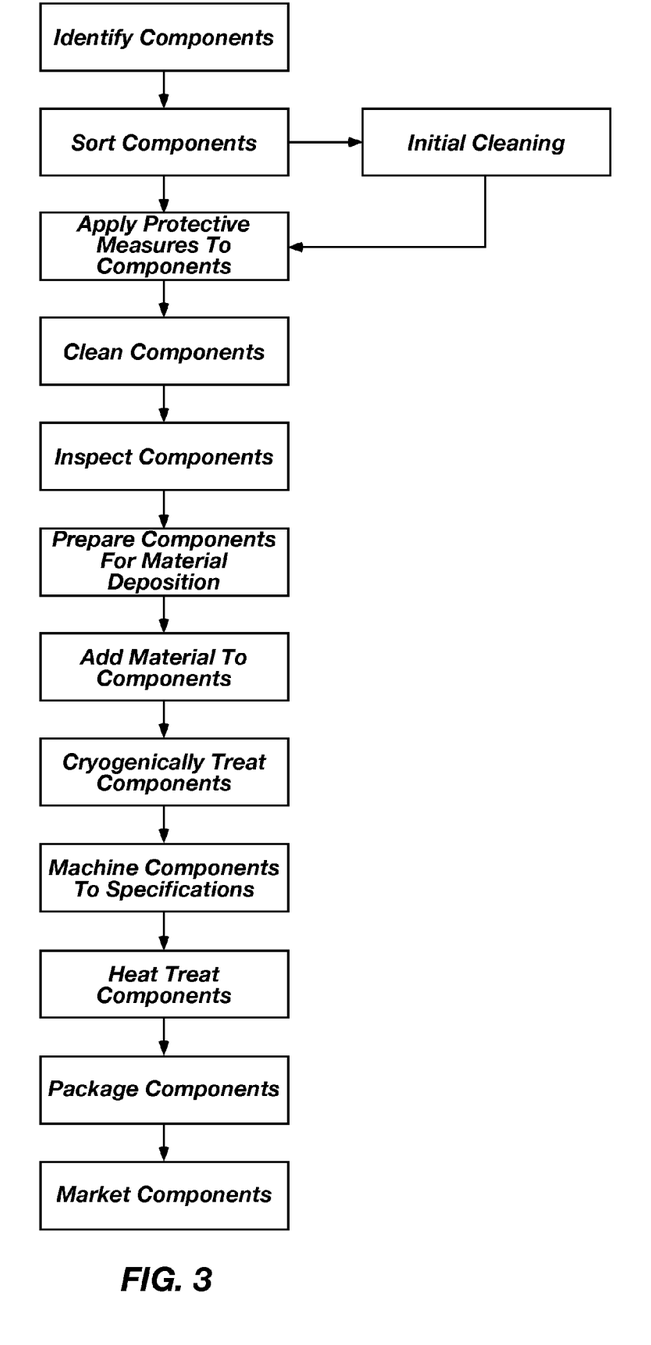
FIG. 3 is a diagram showing steps of a process in accordance with the principles of the present disclosure.

Referring now to FIG. 3, a description of one embodiment of a process useful in accordance with the principles of the present disclosure will be discussed. It is to be understood that not all of the features or steps discussed below and as depicted in FIG. 3 will be required in every embodiment. Moreover, additional steps may be added to the present process beyond those depicted in FIG. 3 and discussed below. Accordingly, the process depicted in FIG. 3 is merely exemplary of one combination of the possible steps that may be used in the presently disclosed process.

One of the first steps that the presently disclosed process may include is the step of identifying the components. It is to be understood that specifications regarding the size, configuration, surface conditions, etc., may be required for a particular component such that the component can be refurbished to meet the original equipment specifications. If a particular component has been identified, such as by year, make, model and/or identification number, it may be possible to determine the required specifications for the component. However, if a component is obtained from a scrap source, for example, identifying information may not be readily associated with the component. In such cases, it may be necessary to identify the component. For example, the components may be manually or automatically examined, measured and/or compared with a knowledge base such as computer databases or reference manuals to determine identifying information to allow the required specifications to be determined. The components may be examined for identification manually using conventional hand gauges such as calipers, micrometers, bore gauges, etc. Custom fixtures or tools may also be utilized to facilitate the proper identification of components. Moreover, a system, such as a coordinate measuring machine (CMM) may be used to readily identify component characteristics by features such as diameter, thickness, and bolt pattern, for example. The CMM may be manually driven or automatically driven such as by a servo-driver or any variety of motor or drive mechanism. The CMM or other devices may obtain digital information about the components using various techniques known in the art such as laser triangulation, optical imaging and/or articulating measurement arms. These devices or techniques may obtain data points digitally for the purpose of generating a computer model of the component.

Once digital data is obtained pertaining to a component, the digital data may be compared with information in a database. The database may contain information regarding various different component characteristics for a variety of different components. For example, a database may include information regarding brake rotors and drums for all vehicles. Accordingly, the particular component may be identified and specifications for the component may be obtained.

It is to be understood that in instances where the component has already been identified, the above mentioned identification process may not be necessary. For example, in some situations, a component may be identified with markings such as painted markings, adhesive labels, bar codes, or other identifying indicia. This may be done prior to sending the component to be refurbished. For example, in some circumstances, payment may be provided for a used component. Various conditions may be stipulated as a prerequisite for receiving payment for the component, such as requiring that the component be identified, packaged, and/or designated with a description of the condition of the component. In other situations, identifying information may be permanently fixed to a component such that the component may be readily identified without additional effort on the part of the owner of the component.

Components such as rotors 12 and/or drums 16 may also be sorted into groups requiring similar treatment. For example, some rotors 12 or drums 16 may require initial cleaning, such as the removal of grease, while other components may not need an initial cleaning step. Likewise, some components may require an identification process, while other components may already be adequately identified. Various other treatment steps may be required for the components such that sorting the components in different categories may facilitate efficient treatment of the components.

Initial cleaning of the components may be accomplished by placing the components in a solvent tank, using high-pressure washers or soap, or heating the components to a certain temperature, for example. The initial cleaning process may be completed through an automated process such that no manual labor or operator intervention may be required. Alternatively, the components may be manually cleaned in some embodiments of the present disclosure.

It is to be understood that some components may not require the initial cleaning operation. Some components may merely contain rust, such that sorting of the components may allow for more efficient treatment of a component tailored to the specific treatment requirements for a particular component. Once the component is adequately cleaned of grease or other unwanted deposits, or if the component is already adequately clean without the need for initial cleaning, the component may be transported to a blast cleaning area for further treatment.

Some components may include features such as wheel studs or threads that may be damaged during blast cleaning. Blast cleaning may involve impacting the component with a pressurized abrasive material, such as glass beads. Accordingly, it may be beneficial to protect sensitive features on the components by covering them with steel protectors or thick rubber tubing, for example. Alternatively, some of the more sensitive features of the components may be removed in some situations such that they may not be damaged by the blast cleaning process. Other embodiments may involve blast cleaning the components and thereafter installing new or undamaged features on the components to replace features that may have been damaged due to the blast cleaning process. Accordingly, the above mentioned steps may be referred to generally herein as applying protective measures to components. It will also be understood that some embodiments of the present disclosure may utilize other cleaning processes, or the components may already be suitably cleaned such that a blast cleaning process may not be required in all instances.

Components may be placed in an enclosed blast cleaning cabinet, such as a sandblast cabinet, to facilitate the blast cleaning process. The component may then be blast cleaned for removal of unwanted material such as rust. It is to be understood that in some embodiments of the present disclosure, the blast cleaning process may provide an effective medium for removing rust while maintaining the integrity of the component. Automated mechanisms may be used for the blast cleaning process, such as a rotary table for receiving the components thereupon, and a fixed nozzle for ejecting an abrasive material against the components as they are moved by the table. Alternatively, the blast cleaning process may be accomplished manually.

It is to be understood that various different types of blast cleaning media suitable for a particular component may be used within the scope of the present disclosure. For example, for some components, steel shot may be too aggressive, whereas glass beads may be suitable. It will also be understood that other embodiments of the present disclosure may utilize other methods of abrasive or non-abrasive cleaning as an alternative to blast cleaning, or the blast cleaning process may be completed at various different stages in the present refurbishing process, such as prior to the metal deposition stage, discussed below.

The components may be inspected to determine if cracks or other flaws or damage may be present on the surface of the component or throughout the component. The timing of the inspection may vary within the principles of the present disclosure. It is to be understood that in some instances, it may be beneficial to perform an inspection of the components after they have been cleaned such that it may be easier to detect damage. Alternatively, inspection of the components may occur initially, or repeatedly at multiple occasions during the refurbishing process. Accordingly, inspections varying in scope may be accomplished at various stages of the refurbishing process.

One embodiment of an inspection process may utilize magnetic particle inspection equipment, such as Magnaflux® magnetic particle or dye penetration inspection equipment and associated chemical products used for non-destructive testing. It is to be understood that any variety of inspection equipment or processes known to those skilled in the art may be used within the scope of the present disclosure. Accordingly, the component may be inspected for integrity to determine whether damage such as stress fractures or other such damage is present. Any components not meeting acceptance criteria may be discarded and not utilized further in the present process.

Figure 1:
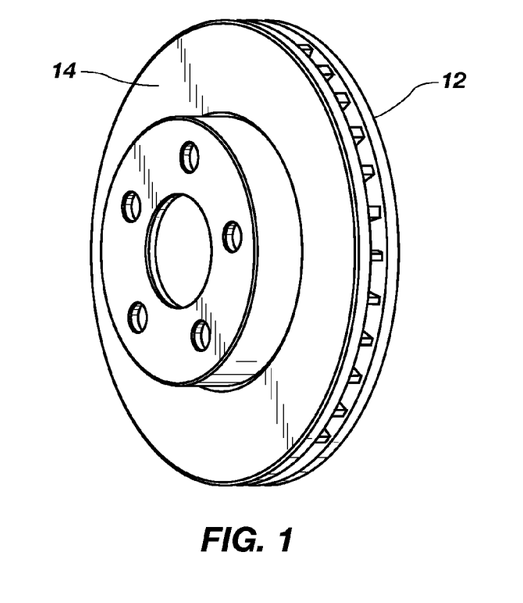
FIG. 1 is a perspective view of a component in the form of a brake rotor for use with the principles of the present disclosure.

If components are still found to be suitable for reclaiming, the present refurbishing process may also include the step of preparing the component for a metal deposition process. For example, the braking surface 14 of the brake rotor 12 or the braking surface 18 of the brake drum 16 may be prepared for a metal deposition process by shot blasting with an abrasive material such as a steel shot. Portions of the component which may not be desired to be shot blasted may be protected. For example, portions of the components may be masked, such as with a thick liquid masking compound, sheet magnets cut to the shape of the desired area to be protected, or using fixtures made of steel or other suitable protective material.

Similar to the blast cleaning process discussed above, the shot blasting step may be accomplished in an enclosed cabinet or area. A high speed shot blasting gun may be used for spraying steel shot against the component, on the braking surface 14 of the brake rotor 12 or the braking surface 18 of the brake drum 16, for example. The shot blasting process may produce a surface on the component which may improve the ability for a metal spray to adhere to the component. Also similar to the blast cleaning process discussed above, the shot blasting process may be accomplished using automated equipment, or the shot blasting process may be performed manually. Moreover, other types of media may be used as an alternative to steel shot, and other processes known in the art for preparing a substrate to receive a deposited material may be used. Alternatively, some embodiments of the present method may not require preparing the component for the metal deposition procedure.

The present refurbishing process may also include a material deposition process in which a material such as metal may be joined with the component. For example, a twin wire (cathode/anode) arc spray gun known to those skilled in the art may be used. The arc spray gun may be arranged in a fixed position in certain instances, or the arc spray gun may be movable in alternative arrangements. It is to be understood that wires for providing metal to be deposited on the components are known in the art and commercially available in a variety of metals and alloys. The commercially available wires may be solid or cored. The cored wires may be used to provide a metal sheath for receiving materials that would otherwise not be able to be drawn through the arc spray gun.

It is to be understood that in the metal deposition process or arc spray process, compressed air may be used to propel molten metal compounds onto target surfaces such as the braking surface 14 of the brake rotor 12 or the braking surface 18 of the brake drum 16, for example. The component, such as the brake rotor 12 or brake drum 16 may be rotated on a special fixture customized for such purpose, or other known equipment suitable for receiving the component may be used. A layer of material may be applied to the component which may be uniform and may be thick enough to produce a rough surface that will allow the finished part to meet required specifications after the finishing operations are performed. Once the metal deposition process has been completed, the component may be allowed to cool to room temperature, or may be artificially controlled so the part cools at a specified rate.

It is to be understood that any variety of material deposition processes known to those skilled in the art may be used within the scope of the present disclosure. For example, metal deposition processes may be used including but not limited to those referred to in the art as flame spray, arc spray, plasma spray, detonation spray, supersonic spray, cold spray or laser cladding processes. These processes may use a variety of media such as metal powders, ceramics and composites in addition to the wires used in the twin-wire arc spray process. Other names for these processes include, but are not limited to, High Velocity Oxygen Fuel (HVOF), wire arc, thermal spray, high-energy plasma or spray-fuse. The metal deposition field is quite mature, and there are many new names and adaptations that may all accomplish the same or similar basic functions. Any such suitable material deposition process known to those skilled in the relevant art may be used within the scope of the present disclosure, including processes that deposit non-metal materials.

While many different metals, ceramics, or alloys may be deposited, in some implementations, mild steel may be the least expensive and may respond well to cryogenic treating for use on brake rotors 12 and drums 16. In other words, nickel, ceramic, or other materials may be deposited and may wear as good or better than mild steel because such materials may be naturally hard, providing what is referred to sometimes as "hard facing." However, for these and other like materials there may be less to be gained through cryogenic treating, even though these materials may be cryogenically treated and may exhibit some increase in wearability. Accordingly, in some embodiments of the present disclosure, mild steel may be advantageously utilized. Nevertheless, various different types of materials may be utilized in accordance with the principles of the present disclosure, including ceramic or alloy materials. It will be appreciated that increases in service life of a component may be dependent upon various component properties.

Further, an optional step that may be used as part of or prior to the material deposition step may include heating or preheating the component such as the brake rotor 12 or drum 16. The preheating step may include preheating the part to a non-molten, non-liquid pre-heated state, before performing the deposition step. The preheating step may inhibit or even prevent the known problem of flaking that sometimes occurs. Flaking is a problem in which flakes of metal are undesirably discharged from the component as the component cools, or after the component has cooled due to insufficient bonding of molten metal to the substrate. Moreover, the preheating step may prevent cracking of the deposited material at the time it initially comes in contact with the component. It is to be understood that in some circumstances, cracking of the deposited material may occur if the deposited material contacts a cooler substrate or component. The cooling rate of the component, once the deposition step is complete, may also need to be controlled in some instances to prevent cooling from occurring too rapidly. This may be accomplished using induction heating equipment, flame heating, or other similar method known to those skilled in the art.

The present refurbishing process may also include cryogenic treatment of the component. Cryogenic treatment of components is known to improve certain characteristics of components in some circumstances. Methods useful in cryogenic treatment of components such as new brake rotors and drums, including profiles of exemplary treatment times and temperatures, are disclosed in U.S. Patent Application Publication No. U.S. 2002/0179204 by Brunson, published Dec. 5, 2002, which reference is incorporated by reference herein in its entirety.

The cryogenic treatment process may involve placing the components in an apparatus configured for generating and maintaining cryogenic temperatures. The cryogenic treatment apparatus may include an enclosure which may have the appearance of a large, well-insulated ice chest, for example. Temperatures may be lowered gradually to extremely low temperatures and maintained for an extended time. Temperatures as low as 250-350 degrees below zero (Fahrenheit), or lower, may be common in cryogenic treatment. The low temperatures may be achieved by flashing liquid nitrogen and forcing super-cooled air into the apparatus. Such a process may be referred to as a dry process, as opposed to traditional cryogenic applications in which an item may be dipped into or sprayed with liquid nitrogen. The dry cryogenic process may provide advantages of achieving desired metallurgical properties in components without damaging the component due to thermal shock. It is to be understood, however, that other cryogenic compounds may also be used as an alternative to nitrogen, depending on factors such as the specific material being treated, for example. Moreover, non-dry processes may also be used in some instances within the scope of the present disclosure.

Improved wear characteristics in some components may result from cryogenic treatment and/or tempering. For example, one component of steel may be austenite, a soft form of iron that may lack strength and durability. Traditional heat and quench tempering may transform some of the austenite, though not all of the austenite, into martensite, a harder form of iron. Cryogenic treating or tempering may transform nearly all of the remaining austenite to martensite. Materials such as austenitic ferrite may be transformed to a martensitic or hardened state by slowly lowering temperatures of the materials and maintaining the materials at a low temperature by soaking the components for an extended period of time. Exemplary soaking times may be within a range of approximately 24-60 hours, for example. It is recognized in the available public knowledge, such as in U.S. Patent Application Publication No. US 2002/0179204 (Brunson), that cryogenic treatment times and temperatures may vary depending on various factors, such as the type of materials used in the component, the mass of the component, and the geometrical configuration of the component, within the scope of the present disclosure.

In further reference to the Brunson publication, the particular treatment times and temperatures that a component may undergo may be commonly referred to as processing profiles. Various different processing profiles known to those skilled in the art may be used within the scope of the present disclosure. One embodiment of a processing profile will now be described, with the understanding that the principles of the present disclosure are not to be limited to the processing profile described herein.

The component may be at a temperature of approximately 100 degrees F. when it is placed into the cryogenic treatment apparatus. A cryogenic compound, such as gaseous nitrogen may be introduced into the cryogenic treatment apparatus to decrease the temperature of the component to approximately −250 to −350 degrees F. at a specified descent rate. An exemplary temperature may be −300 degrees F, for example. The descent rate may be determined for a particular component depending on the component properties such as material, mass, and geometrical configuration. For example, one implementation of a descent rate may be approximately 35 degrees F. per hour for certain components with a mass of 1,000-1,500 pounds and a cross-sectional area greater than 4 inches. Once the component reaches approximately −300 degrees F., the temperature of the component may be held for a period of time referred to as the soak or stay time. The soak time may also be dependent on the component properties, and may be approximately 24 hours for the components described above having a mass of 1,000-1,500 pounds and a cross-sectional area greater than 4 inches.

After the soak time, the temperature of the component may be raised to approximately 300 degrees F. at an ascent rate. The ascent rate may also be dependent on the component properties. An exemplary ascent rate may be approximately 12 degrees per hour. Accordingly, the cryogenic compound may be removed from the cryogenic treatment apparatus to bring the temperature of the component to approximately −100 degrees F. Once the temperature of the component is at approximately −100 degrees F., the component may then be transported to a tempering device to raise the temperature of the component to approximately 300 degrees F. The stage during which the temperature of the component is raised to approximately 300 degrees F. may be referred to sometimes as the ascent stage.

Once the temperature of the component reaches approximately 300 degrees F., the temperature may be held for a period of time sometimes referred to as a post temper time. The post temper time may also be dependent on the component properties such as material, mass, and geometrical configuration. One implementation of a post temper time may be one hour, for example. The temperature of the component may then be reduced to ambient and increased again to 300 degrees F. for a second post temper time, and further reduced to ambient temperature and increased again to 300 degrees F. for a third post temper time. It is to be understood that the second and third post temper times may be optional depending on the properties of the specific component, and that additional or fewer post temper times may be utilized.

After the post temper process, the temperature of the component may be lowered to ambient temperature during a final cool-down stage. The cool-down rate may also be dependant on the component properties. An exemplary cool-down rate may be approximately 12 degrees per minute. Once the component has cooled sufficiently, the component may be removed from the tempering devices and the process may be complete.

It is to be understood that other heat treatment processes, times and temperatures known to those skilled in the art may be utilized to achieve a component having optimum wear and hardness characteristics. Moreover, it is to be understood that the heat treatment process may be carried out at different stages during the presently disclosed refurbishing process, and in some situations, the heat treatment process may be omitted.

After the cryogenic treatment process, the component may be machined to the original equipment manufacturer (OEM) specifications, or other suitable specified configuration. This may be accomplished by grinding the components such as rotors 12 on a device such as a grinding machine known to those skilled in the art. The grinding machine may comprise a dual-disc grinding machine, or a single disc grinding machine, or any other suitable grinding machine. A dual-disc grinding machine may be used to grind opposing surfaces of a rotor 12 at the same time. Accordingly, the dual-disc grinding machine may provide a surface finish that may be of high quality and possibly superior to OEM finishes. It is to be understood that other machining devices may be used to grind or otherwise finish components, such as rotors 12, in accordance with the principles of the present disclosure. It is also to be understood that machining may involve only the new material joined with the component during the material deposition step, only the original material in the component, or both the new material and the original material in the component. "Original material" as used herein refers to the material in the component prior to joining material to the component in the material deposition step.

Similarly, components such as brake drums 16 may be turned on a device such as a lathe. This may allow the brake drum 16 to obtain a surface 18 having a finish that may be comparable to OEM finishes. It will be appreciated that brake drums refurbished in accordance with the principles of the present disclosure may have superior wear characteristics as compared to other brake drums. This may be true even for brake drums having similar surface treatments as provided by the OEM brake drums. It will also be understood that various different components may be machined using other tools or devices suitable for the particular component.

It is to be understood that the order of the steps discussed herein may be rearranged in some situations. For example, in some situations it may be desirable to accomplish the cryogenic treatment process prior to the machining process. In other situations, the machining process may be accomplished prior to the cryogenic treatment process if it is found that machining process re-introduces stresses into the component following the cryogenic treatment process or if cryogenic treating renders the component too hard to perform machining operations on.

Figure 4:
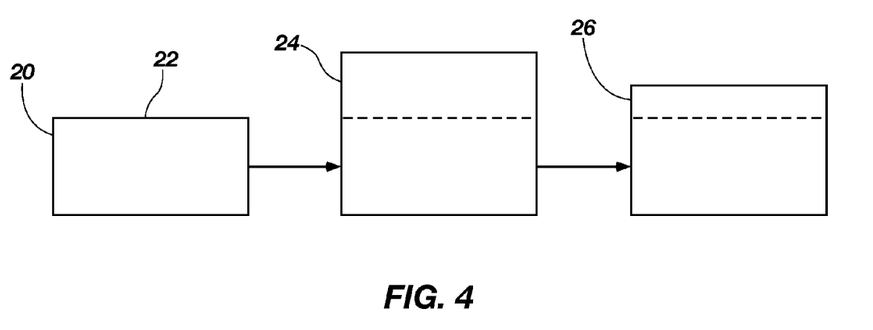
FIG. 4 is a schematic view of a component as it undergoes a material deposition step and machining step in accordance with the principles of the present disclosure.

Referring to FIG. 4, a schematic diagram is shown of a component as it undergoes some of the steps in accordance with the principles of the present disclosure. It is to be understood that the component as shown in FIG. 4 is for illustrative purposes only, and should not be construed as limiting the scope of the present disclosure. As shown in FIG. 4, a component or a portion of a component, indicated at 20, may be selected having a deficient condition. For example, a surface 22 may be worn such that the component 20 may have a reduced dimension, as depicted by the reduced height of the component 20. Accordingly, the component 20 may have a dimension that does not meet desired working specifications for the particular component. A material may be joined with the component as indicated at 24 such that the component may have an increased dimension. It will be noted that the component 24 has a greater height than the component 20. The material added to the component 24 may create an increased dimension beyond desired specifications. Accordingly, the component may be machined, as indicated at 26, such that the component may be formed within a specified configuration. As discussed above, the machining may be accomplished by grinding the component 24 or turning the component 24 on a lathe, for example, to achieve the finished configuration of the component 26.

It is to be understood that the cryogenic treatment process may be completed on the component 24 having an increased dimension, or in other situations, the cryogenic treatment process may be completed on the component 26 having the finished configuration. Moreover, in some situations, material may be added to the component 20 to arrive at the specified configuration without a machining step. It will also be understood that the dashed lines as shown in FIG. 4, are for illustrative purposes to indicate the position of the worn surface 22. However, it is to be understood that in certain circumstances, the process described herein may be utilized to provide a component that is substantially a one-piece unitary member, characterized by an absence of a joint.

Once the component has been refurbished in accordance with the principles of the present method, the component may be packaged, labeled or otherwise prepared for marketing, or the component may be used directly. The refurbished components may be marketed in any manner known to those skilled in the art. For example, components such as brake rotors 12 and drums 16 may be distributed through a specialized company, or through existing part or repair establishments. It will also be understood that franchise operators may be established and equipment, supplies, cryogenic services, technology, etc., could be provided to the franchise operators for royalties or licensing fees.

In accordance with the features and combinations described above, a useful method of refurbishing a component may include:

joining a material with the component to replace a portion of the component that has been worn away from the component; and cryogenically treating the component.

In accordance with the features and combinations described above, another useful method of refurbishing a component may include:

selecting a component in a deficient condition;

cryogenically treating the component; and machining the component such that the component is formed in a specified configuration.

Those having ordinary skill in the relevant art will appreciate the advantages provided by the features of the present disclosure. For example, it will be appreciated that the principles of the present disclosure may be utilized to capitalize on many other types of previously manufactured components which may otherwise be worn out or "scrap" components. Also, the present method may capitalize on the technology and labor previously used to make the components, thereby preserving natural and human resources.

Another feature of the present disclosure may be to provide ground surface finishes on rotors (as opposed to rotors machined on a lathe) that may yield better surface finishes. This may be particularly important to high performance and racing enthusiasts at the present time. However, improved components may also create demand by other customers as well. Better surface finishes may also help prevent "brake judder" or "brake pulsing" common to disc brakes as rotors warp due to intense heat generated when brakes are applied.

It is a further feature of the present disclosure, in accordance with one aspect thereof, to provide cryogenic treating of components which may also be utilized to virtually eliminate soft or "hot" spots in cast brake parts. The soft or "hot" spots may be caused due to graphite buildup in pockets throughout drums and particularly rotors, as a result of the casting process. Moreover, cryogenic treating may change the grain structure of material in the component and may improve adhesion characteristics of the sprayed metal by making the new part substantially completely homogenous. In contrast, metal sprayed parts not cryogenically treated may include a boundary which may be more detectable when mild steel is the material used in the component. As discussed above, however, when other materials are used, the wear characteristic gains may not be as great as that of mild steel because the other materials may be harder or exhibit greater wear properties in the first place.

It will also be understood that the principles of the present disclosure may be utilized to allow the reuse of components that may typically be thrown away and which may eventually end up in landfills. A better option than wasting the components would be to sell the components for steel scrap prices. However, prices paid for scrap are often very low and products made from scrap iron may be inferior due to the various unknown iron and steel compositions that may all be combined together as the scrap is melted down.

The principles of the present disclosure may also provide unlimited life cycles for components or core parts. The components may be refurbished repeatedly, even after they have been refurbished previously through the present process. Accordingly, the present methods may allow the components to be a renewable resource. Only when the structural integrity of the components falls below specified criteria would the components "fall out" or not be reused.

The methods disclosed herein may allow components, such as brake rotors and drums to be used for extended periods of time. Also, the components may be refurbished to be better than new rotors and drums that are not cryogenically treated, in terms of wear characteristics. Moreover, the cost of the refurbished components may be comparable to that of new components, and in some situations, the refurbished components may be more economically priced than new components. The methods disclosed herein may improve the quality of brake drums and rotors such that extended part warrantees may be offered beyond warrantees currently available for drums and rotors. Additionally, steel prices in the U.S. have been rising such that more drums and rotors have been produced in foreign countries, or the drums and rotors have been manufactured of sub-standard steel or less expensive labor to keep costs down. The present methods may therefore be utilized to reduce the negative impacts of higher steel prices.

The present process may also allow the production of re-manufactured drum and rotor products that may be comparable in quality for wear to cryogenically treated new parts. Moreover, the quality of brake rotors produced in accordance with the principles of the present disclosure may be improved over other brake rotors due to superior surface finish and parallelism of braking surfaces that may be produced by the methods disclosed herein.

It will also be understood that the principles of the present disclosure may be utilized to allow salvage yards, auto repair shops, wholesale and retail auto parts stores or other potential sources to benefit from revenues as a result of core-exchange incentives at the time of purchase of new components, such as brake drums and rotors. These incentives may also help to motivate recycling of components. Moreover, pressure exerted on the part of "green" or environmental movements could have a great impact on the industries involved with the particular components. For example, if opportunities to recycle components were widely known, companies could benefit by advertising their support for the present technology, and thereby improve the environmental image of the companies.

In the foregoing Detailed Description, various features of the present disclosure are grouped together in a single embodiment for the purpose of streamlining the disclosure. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment. Thus, the following claims are hereby incorporated into this Detailed Description by this reference, with each claim standing on its own as a separate embodiment of the present disclosure.

It is to be understood that the above-described arrangements are only illustrative of the application of the principles of the present disclosure. Numerous modifications and alternative arrangements may be devised by those skilled in the art without departing from the spirit and scope of the present disclosure and the appended claims are intended to cover such modifications and arrangements. Thus, while the present disclosure has been shown in the drawings and described above with particularity and detail, it will be apparent to those of ordinary skill in the art that numerous modifications, including, but not limited to, variations in size, materials, shape, form, function and manner of operation, assembly and use may be made without departing from the principles and concepts set forth herein.

What is claimed is:

1. A method of refurbishing a component, said method comprising:
   joining a material with said component to replace a portion of said component that has been worn away from said component; and
   cryogenically treating said component;
   wherein joining said material with said component comprises spraying a molten metal material onto said component and wherein said component is a brake rotor.

2. The method of claim 1, further comprising identifying said component to determine a specified configuration of said component.

3. The method of claim 2, wherein identifying said component to determine a specified configuration of said component comprises determining one of a group consisting of a year, make, model and identification number of said component.

4. The method of claim 2, further comprising identifying said component to determine a specified configuration of said component according to its original classification or specification requirements.

5. The method of claim 1, further comprising sorting said component into a group with other components that require a similar treatment.

6. The method of claim 5, wherein sorting said component into a group with other components that require a similar treatment comprises sorting said component into a group of components that require cleaning.

7. The method of claim 1, further comprising applying a protective measure to said component to protect at least a portion of said component from damage caused during treatment of said component.

8. The method of claim 7, wherein applying a protective measure to said component to protect at least a portion of said component from damage caused during treatment of said component comprises covering at least a portion of said component with a protective covering.

9. The method of claim 1, further comprising cleaning said component.

10. The method of claim 9, wherein cleaning said component comprises one of a group consisting of blast cleaning with abrasive media, placing the components in a solvent tank, using high-pressure washers, and heating the components.

11. The method of claim 1, further comprising inspecting said component for damage.

12. The method of claim 11, wherein inspecting said component for damage comprises a nondestructive inspection of said component.

13. The method of claim 12, wherein inspecting said component for damage comprises a magnetic particle inspection of said component.

14. The method of claim 12, wherein inspecting said component for damage comprises a dye penetration inspection of said component.

15. The method of claim 1, further comprising blasting said component with an abrasive material to prepare said component for joining with said material.

16. The method of claim 15, wherein blasting said component with an abrasive material to prepare said component for joining with said material comprises blasting said component with steel shot.

17. The method of claim 1, further comprising machining said component such that said component is formed in a specified configuration.

18. The method of claim 17, wherein machining said component comprises grinding said component on a grinding machine.

19. The method of claim 18, wherein machining said component comprises grinding said component on a dual-disc grinding machine.

20. The method of claim 17, wherein machining said component comprises turning said component on a lathe.

21. The method of claim 1, further comprising machining said component to a specified configuration.

22. The method of claim 21, wherein machining said component comprises machining original material of the component.

23. The method of claim 21, wherein machining said component comprises machining new material of the component that has been joined to original material of the component.

24. The method of claim 1, further comprising heat treating said component.

25. The method of claim 1, further comprising packaging said component.

26. The method of claim 1, further comprising marketing said component.

27. The method of claim 1, further comprising:
   identifying said component to determine a specified configuration of said component;
   placing said component in a group with other components that require a similar treatment;
   applying a protective measure to said component to protect at least a portion of said component from damage caused during treatment of said component;
   cleaning said component;
   inspecting said component for damage;
   blasting said component with an abrasive material to prepare said component for joining with said material;
   machining said component to a specified configuration;
   heat treating said component;
   packaging said component; and
   marketing said component;
   wherein cryogenically treating said component comprises reducing a temperature of said component within a range of approximately −250 to −350 degrees Fahrenheit for between approximately 24 to 60 hours;
   wherein identifying said component to determine a specified configuration of said component comprises determining one of a group consisting of a year, make, model and identification number of said component;
   wherein placing said component into a group with other components that require a similar treatment comprises sorting said component into a group of components that require cleaning;
   wherein applying a protective measure to said component to protect at least a portion of said component from damage caused during treatment of said component comprises covering at least a portion of said component with a protective covering;
   wherein cleaning said component comprises one of a group consisting of blast cleaning with abrasive media, placing the components in a solvent tank, using high-pressure washers, and heating the components;

wherein inspecting said component for damage comprises a non-destructive inspection of said component;

wherein inspecting said component for damage comprises one of a group consisting of a magnetic particle inspection of said component, a dye penetration inspection of said component, and a visual inspection of said component;

wherein blasting said component with an abrasive material to prepare said component for joining with said material comprises blasting said component with steel shot;

wherein joining said material with said component comprises heating said component to prevent cracking of the metal material when it comes into contact with the component;

wherein machining said component comprises one of a group consisting of grinding said component on a dual-disc grinding machine and turning said component on a lathe;

wherein said component comprises a surface for receiving said molten metal material, said surface comprising a free perimeter.

28. The method of claim 1, further comprising:
selecting said component in a deficient condition; and
machining said component such that said component is formed in a specified configuration.

29. The method of claim 28, further comprising identifying said component to determine a specified configuration of said component.

30. The method of claim 28, further comprising blasting said component with an abrasive material.

31. The method of claim 28, further comprising heat treating said component.

32. The method of claim 28, wherein selecting a component in a deficient condition comprises selecting a component that has been worn due to use.

33. The method of claim 1, further comprising:
selecting said component in a deficient condition; and
treating said component with an abrasive material.

34. The method of claim 33, wherein selecting said component in a deficient condition comprises selecting a component that has been worn due to use.

35. The method of claim 33, wherein treating said component with an abrasive material comprises impacting said component with said abrasive material.

36. The method of claim 33, wherein joining said material with said component comprises propelling a molten metal material onto said component.

37. The method of claim 33, further comprising machining said component such that said component is formed in a specified configuration.

38. The method of claim 33, further comprising identifying said component to determine a specified configuration of said component.

39. The method of claim 1, wherein said component comprises:
a substrate; and
said material comprises a wear surface deposited on said substrate to provide enhanced wear characteristics.

40. The method of claim 39, wherein said wear surface comprises a metallic material that has been deposited in a molten state on said substrate.

41. The method of claim 39, wherein said wear surface comprises martensite.

42. The method of claim 39, wherein said wear surface has been machined such that said component is configured in accordance with original equipment manufacturer specifications.

43. The method of claim 39, wherein said component has been heat treated.

44. The method of claim 39, wherein said substrate has been impacted by an abrasive material.

45. The method of claim 1, wherein cryogenically treating said component comprises reducing a temperature of said component to approximately −300 degrees Fahrenheit.

46. The method of claim 45, wherein cryogenically treating said component comprises maintaining said temperature of said component at approximately −300 degrees Fahrenheit for between approximately 24 to 60 hours.

47. The method of claim 46, further comprising raising said temperature of said component to approximately 300 degrees Fahrenheit.

48. The method of claim 47, further comprising cooling said component to ambient temperature.

49. The method of claim 1, wherein joining said material with said component comprises heating said component to prevent cracking.

50. A method of refurbishing a component, said method comprising:
joining a material with said component to replace a portion of said component that has been worn away from said component; and
cryogenically treating said component;
wherein said component is a brake rotor.

51. A method of refurbishing a component, said method comprising:
joining a material with said component to replace a portion of said component that has been worn away from said component; and
cryogenically treating said component;
wherein joining said material with said component comprises spraying a molten metal material onto said component;
wherein said component is a two-sided brake rotor.

52. A method of refurbishing a component, said method comprising:
joining a material with said component to replace a portion of said component that has been worn away from said component;
cryogenically treating said component; and
machining said component after said component has been cryogenically treated such that said component is formed in a specified configuration corresponding to said component before said portion of said component has been worn away;
wherein said component is a brake rotor.

53. The method of claim 1, wherein said component comprises a surface for receiving said molten metal material, said surface comprising a free perimeter.

* * * * *